US010213690B2

(12) United States Patent
George et al.

(10) Patent No.: US 10,213,690 B2
(45) Date of Patent: Feb. 26, 2019

(54) DETERMINING REAL-WORLD EFFECTS FROM GAMES

(71) Applicant: Amazon Technologies, Inc., Seattle, WA (US)

(72) Inventors: Michael Martin George, Mercer Island, WA (US); Justin Michael George, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/464,277

(22) Filed: Mar. 20, 2017

(65) Prior Publication Data

US 2017/0197148 A1    Jul. 13, 2017

Related U.S. Application Data

(63) Continuation of application No. 14/317,961, filed on Jun. 27, 2014, now Pat. No. 9,597,584.

(51) Int. Cl.
*A63F 13/63* (2014.01)
*A63F 13/00* (2014.01)
(Continued)

(52) U.S. Cl.
CPC .............. *A63F 13/63* (2014.09); *A63F 13/00* (2013.01); *A63F 13/355* (2014.09); *A63F 13/57* (2014.09)

(58) Field of Classification Search
None
See application file for complete search history.

(56) References Cited

U.S. PATENT DOCUMENTS 8,473,382 B2    6/2013    Jung et al.
8,512,140 B1*   8/2013    Omi .................... A63F 13/00
                                                            348/571
(Continued)

FOREIGN PATENT DOCUMENTS

WO         2008124941        4/2008

OTHER PUBLICATIONS

Amar, Nir, et al. "Synthesizing reality for realistic physical behavior of virtual objects in augmented reality applications for smartphones." Virtual Reality (VR), 2013 IEEE. IEEE, 2013, pp. 1-2.
(Continued)

*Primary Examiner* — Ronald Laneau
(74) *Attorney, Agent, or Firm* — Robert C. Kowert; Meyertons, Hood, Kivlin, Kowert & Goetzel, P.C.

(57) ABSTRACT

A game system in which virtual representations of real-world, physical objects may be designed or modified by game players within a virtual game universe. Real-world physical interactions of the virtual objects may be simulated by a game engine during game play within the game universe. Performance data may be collected for the virtual objects that simulates real-world performance data for corresponding physical objects. The performance data for the virtual objects may, for example, be used in evaluating performance of modifications to a physical object, or for comparing performance of two or more physical objects. Production or manufacturing decisions for respective physical objects may be made at least in part based on the performance data collected for the virtual representations of the objects.

20 Claims, 10 Drawing Sheets

(51) Int. Cl.
*A63F 13/57* (2014.01)
*A63F 13/355* (2014.01)

(56) References Cited

U.S. PATENT DOCUMENTS

| | | | |
|---|---|---|---|
| 8,645,230 B2 | 2/2014 | Oliver et al. | |
| 8,758,109 B2 | 6/2014 | Lutnick | |
| 9,317,981 B2 | 4/2016 | Friedrich | |
| 9,597,584 B1 | 3/2017 | George et al. | |
| 2009/0227368 A1* | 9/2009 | Wyatt | A63F 13/10 463/31 |
| 2010/0113145 A1* | 5/2010 | Yan | A63F 13/12 463/29 |
| 2011/0213482 A1 | 2/2011 | Saarela | |
| 2012/0244948 A1 | 3/2012 | Dhillon | |
| 2012/0122572 A1* | 5/2012 | Kelly | A63F 13/80 463/31 |
| 2013/0231999 A1 | 8/2013 | Emrich | |
| 2014/0129394 A1 | 1/2014 | Oliver | |
| 2017/0296921 A1* | 10/2017 | Graham | A63F 13/52 |

OTHER PUBLICATIONS

Lok, Benjamin, et al. "Incorporating dynamic real objects into immersive virtual environments." Proceedings of the 2003 symposium on Interactive 3D graphics. ACM, 2003, pp. 31-40.
"Unity Manual", accessed Jun. 27, 2014, pp. 1-32.
U.S. Appl. No. 14/318,302, filed Jun. 27, 2014, Michael Schleif Pesce.
U.S. Appl. No. 14/318,273, filed Jun. 27, 2014, Michael Schleif Pesce.
U.S. Appl. No. 14/500,413, filed Sep. 29, 2014, Collin Charles Davis.
U.S. Appl. No. 14/500,451, filed Sep. 29, 2014, Michael Anthony Frazzini.
U.S. Appl. No. 14/500,619, filed Sep. 29, 2014, Christian Robert Cabanero.
U.S. Appl. No. 14/500,593, filed Sep. 29, 2014, Christian Robert Cabanero.
U.S. Appl. No. 14/500,600, filed Sep. 29, 2014, Christian Robert Cabanero.
U.S. Appl. No. 14/500,580, filed Sep. 29, 2014, Christian Robert Cabanero.

* cited by examiner

DETERMINING REAL-WORLD EFFECTS FROM GAMES

This application is a continuation of U.S. patent application Ser. No. 14/317,961, filed Jun. 27, 2014, now U.S. Pat. No. 9,597,584, which is hereby incorporated by reference herein in its entirety.

BACKGROUND

Computer-based games have evolved from single-player game programs installed and executed on personal computers or other consumer devices to include technologies that allow multiplayer gaming in which two or more players may simultaneously participate in a game session. For example, game consoles may host console-based games that allow one, two, or more players to simultaneously participate in a game session via controllers connected to the console. As another example, network-based games, which may be referred to as online games, may allow one, two, or more players, in some cases even thousands of players, to simultaneously participate in a game from consumer devices coupled to a network. Evolution of the Internet, Web-based computing, and mobile computing, including the increasingly widespread availability of broadband connections and the availability and capabilities of consumer computing devices including but not limited to mobile computing devices such as pad/tablet devices and smartphones, has led to continuing evolution and growth of online gaming. Online games may include everything from relatively simple, two-dimensional (2D) casual games to more complex 2D or three-dimensional (3D) action or strategy games that may involve one or more players in a game session, to world-building multiplayer games, to complex 3D massively multiplayer online games (MMOGs) such as massively multiplayer online role-playing games (MMORPGs) that may simultaneously support hundreds or thousands of players in a persistent online "world".

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for designing, modifying, and evaluating real-world objects using computer-based games, including but not limited to online multiplayer games, are described. Embodiments of a game system are described that may be used to design or modify designs for physical objects, instantiate virtual representations of the objects as virtual objects within a game universe, simulate real-world interactions of the virtual objects within the game universe according to a realistic physics model, and generate and output performance data for the virtual objects that simulates real-world performance data for the physical objects. Embodiments of the game system may, for example, be used in product design and production environments for evaluating performance of new or modified designs for physical object, or for comparing performance of two or more physical objects. In such environments, production or manufacturing decisions for respective physical object designs may be based at least in part on evaluations of performance data generated for virtual objects during game play within a virtual game universe of the game system.

Figure 1:
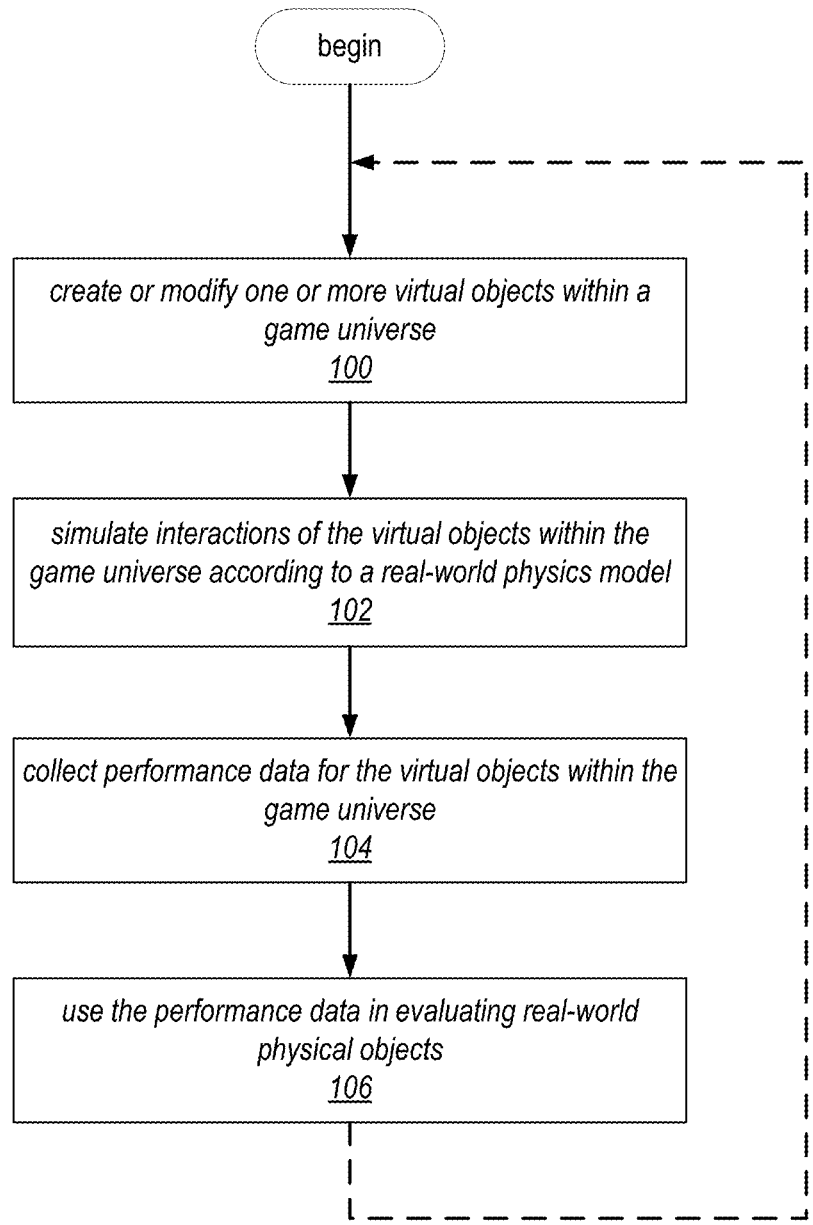
FIG. 1 is a high-level flowchart of a method for using game systems to simulate performance of real-world physical objects, according to at least some embodiments.

FIG. 1 is a high-level flowchart of a method for using game systems to simulate performance of real-world physical objects, according to at least some embodiments. Embodiments of a game system are described in which virtual representations of real-world, physical objects (referred to herein as virtual objects) may be created or modified by game players within a virtual game universe, as indicated at 100. As indicated at 102, interactions of the virtual objects may be simulated by a game engine according to a real-world physics model during game play within the game universe. As indicated at 104, performance data may be collected for the virtual objects that simulates real-world performance data for respective, similarly modified, physical objects. As indicated at 106, the performance data may be used in evaluating real-world physical objects. The performance data for the virtual objects may, for example, be used in evaluating performance of particular modifications to a particular physical object, or for comparing performance of two or more physical objects. Production or manufacturing decisions for respective physical objects may be made at least in part based on the performance data collected for the virtual representations of those objects. As shown by the dashed line returning to element 100, the method may be iteratively performed.

Figure 2:
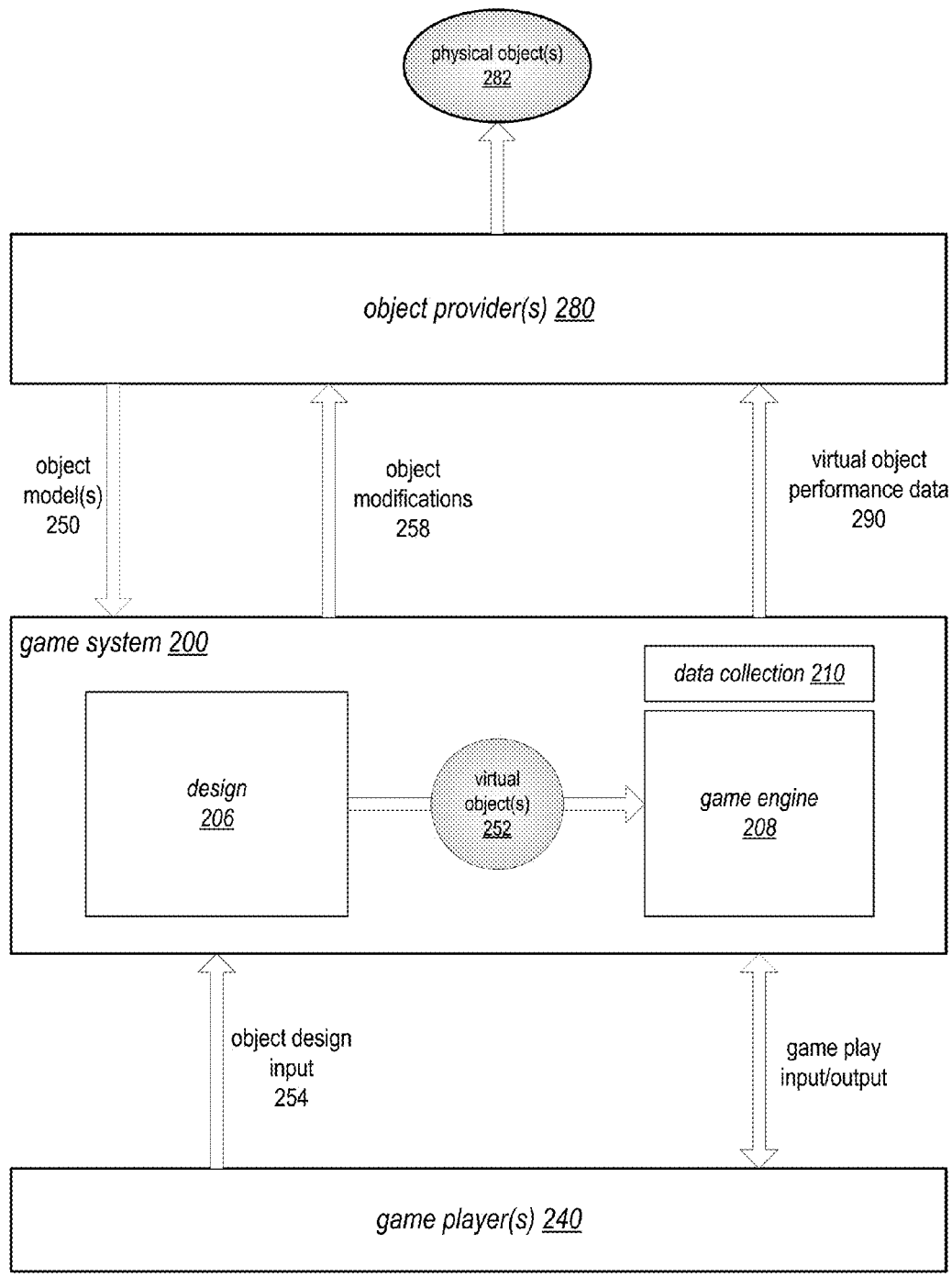
FIG. 2 is a high-level block diagram illustrating an example environment for object design and performance evaluation in which a game system is used to design or modify objects and to simulate real-world interactions of the objects using virtual representations of the objects within a game universe, according to at least some embodiments.

FIG. 2 is a high-level block diagram illustrating an example environment for object design and performance evaluation in which a game system is used to design or modify objects and to simulate real-world interactions using virtual representations of the objects within a game universe, according to at least some embodiments. As shown in FIG. 2, in some embodiments, a game system 200 may include at least a design 206 component or module, a game engine 208, and a data collection 210 component or module. The environment may include at least one game system 200, one or more players 240, and one or more object providers 280. Object providers 280 may include one or more of, but are not limited to, product designers, product producers (e.g., manufacturers), vendors, research labs, distributors, universities, or in general any entity that may have some interest in object design, performance evaluation, and/or object production, and that may provide object models for evaluation and/or receive performance data and object modifications from the game system 200 for evaluation.

Embodiments of a game system 200 may include a design 206 component that allows players 240 to create, select, and/or modify virtual representations of real-world, physical objects (referred to herein as virtual objects 252) via object design input 254. The design 206 component may provide one or more graphical and/or textual interfaces via which players 240 or other entities may design and modify virtual objects 252 for use within the game universe. In some embodiments, object model(s) 250 from which virtual objects 252 may be generated may be obtained from one or more sources external to the game system 200. For example, an object provider 280 (e.g., a product producer such as a manufacturer, a vendor, research lab, distributor, etc.) may provide an object model 250 from which a virtual object 252 may be generated by the game system 200. In some embodiments, instead of or in addition to obtaining object models 250 from object provider(s) 280, a player 240 or team of players may access design 206 component to create and define an object model 250 for a new virtual object 252 within the game system 200 via an interface to the design 206 component.

In at least some embodiments, once an object model 250 is obtained or created, a virtual object 252 may be instantiated within the game universe according to the object model 250, and a player 240 or team of players may make one or more modifications to the virtual object 252 via an interface to the design 206 component. In some embodiments, modifications to a virtual object 252 within the game universe may cause the corresponding object model 250 to be modified or updated within the game system 200. In some embodiments, the modifications 258 to a virtual object 252 made by a player 240 via design 206 component may be provided to one or more external entities (e.g., object providers 280). As an example, modifications 258 to a virtual object 252 may be provided to an object provider 280 (e.g., a product producer (e.g., a manufacturer), vendor, research lab, distributor, etc.) that provided the respective object model 250 from which the modified virtual object 252 was generated. As another example, a design specification or object model 250 for a new physical object 282 created and tested by a player 280 or team as a virtual object 252 within the game universe may be provided to one or more object providers 280 for evaluation, along with performance data 258 for the virtual object 252.

Embodiments of a game system 200 may include or leverage a game engine 208 that may simulate real-world physical interactions of the virtual objects 252 within a virtual game environment, referred to herein as a game universe, at least in part in response to game input from players 240. To simulate interactions within the game universe, the game engine 208 may apply a physics model that incorporates one or more of, but is not limited to: global, generally static physical factors (e.g., gravity); player 240 game input (e.g., input controlling the virtual objects 252 in a game session); characteristics of the virtual objects 252 as defined by object models; and environmental factors within the game universe including generally static (e.g., topography) and potentially dynamic (e.g., weather, earthquakes, etc.) environmental factors.

Embodiments of a game system 200 may include a data collection 210 component that collects performance data 290 for the virtual objects 252 during game play. The collected performance data 290 may be provided to one or more entities for analysis, for example to object providers 280 external to the game system. The performance data 290 may be provided or distributed to an object provider 280 in any of various ways and via a variety of communications channels, including but not limited to as a real-time stream of data during game play or as periodic or aperiodic uploads or downloads of collections of performance data 290 to the object provider 280. Note that performance data 252 collected for a virtual object 252 may be distributed to two or more different object providers 280, and performance data 252 collected for two or more different virtual objects 252 may be distributed to respective ones of two or more different object providers 280. Note that, in some embodiments, instead of or in addition to providing the performance data 290 to object providers 280, at least part of the performance data 290 may be provided to one or more of the players 240 or to teams of players 240.

The performance data 290 for the virtual objects 252 may be evaluated, for example by an object provider 280 such as a product producer (e.g., a manufacturer), vendor, research lab, distributor, etc., and may be used, for example, in making decisions regarding real-world production or marketing of various products. In some cases, at least one instance of a physical object 282 corresponding to a virtual object 252 may be generated, manufactured, constructed, or assembled by an object provider 280 at least in part based on the evaluation of the performance data 290 for the virtual object 252.

In at least some embodiments, the game system 200 may provide one or more user interfaces (e.g., via web pages or client applications) and/or one or more application programming interfaces (APIs) via which object providers 280 may access the game system 200 to perform various functions. For example, an API may be provided via which an object provider 280 may provide object models 250 and other object information such as performance aspects that are to be monitored for the object models 250 to the game system 200, receive object modifications 258 from the game system 200, and obtain virtual object performance data 290 from the game system 200.

In some embodiments, in addition to collecting and providing performance data 290 that simulates real-world performance data for physical objects, the game system 200 may also collect and provide information on various preferences of the players 240 that may, for example, be used, alone or in combination with the performance data 290, in making production or marketing decisions. The preference information may, for example, indicate which particular virtual objects 252 are used most, which modifications to virtual objects 252 are popular, which combinations of virtual objects 252 are popular, and so on.

Figure 5:
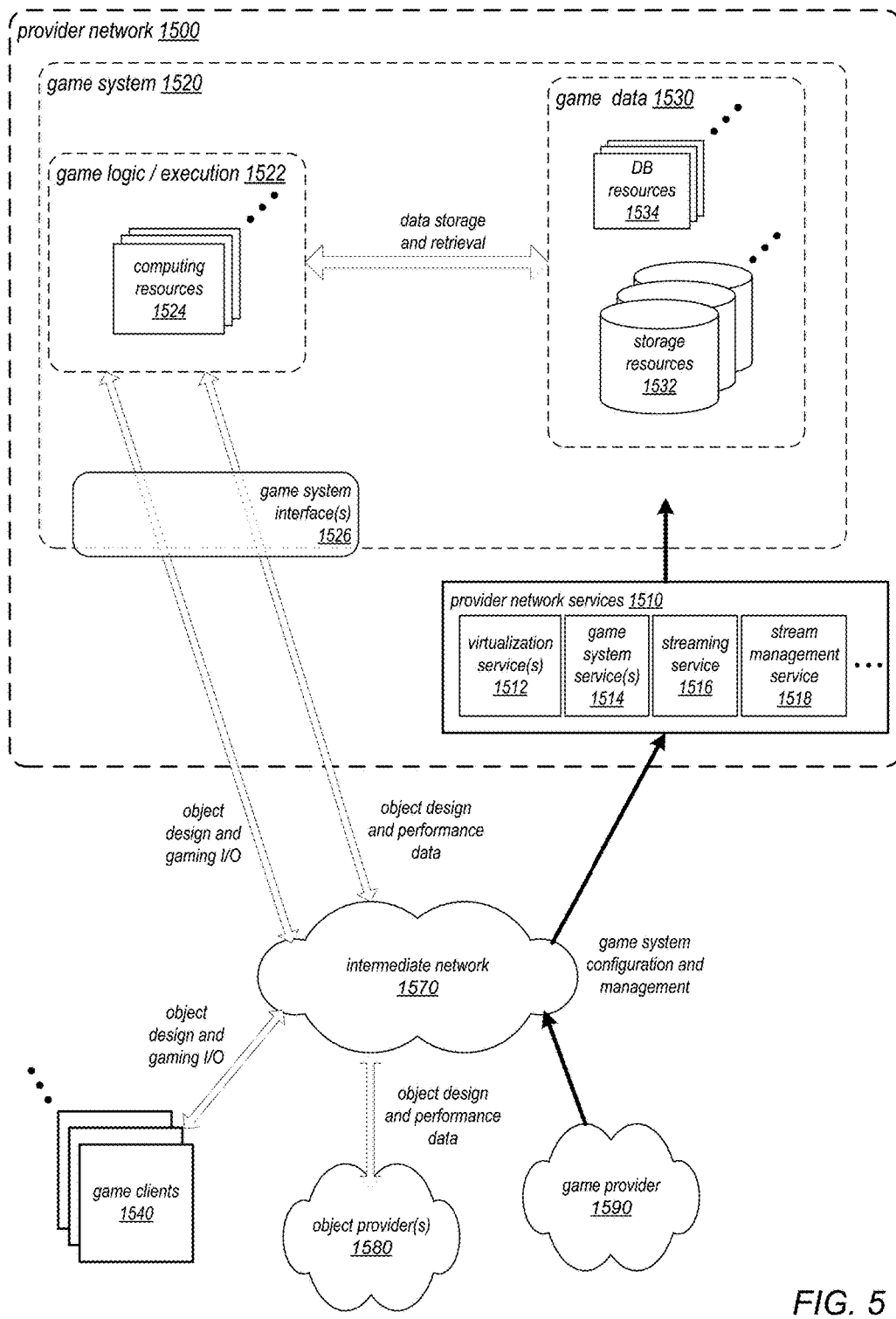
FIG. 5 illustrates an example network-based gaming environment, according to at least some embodiments.
Figure 7:
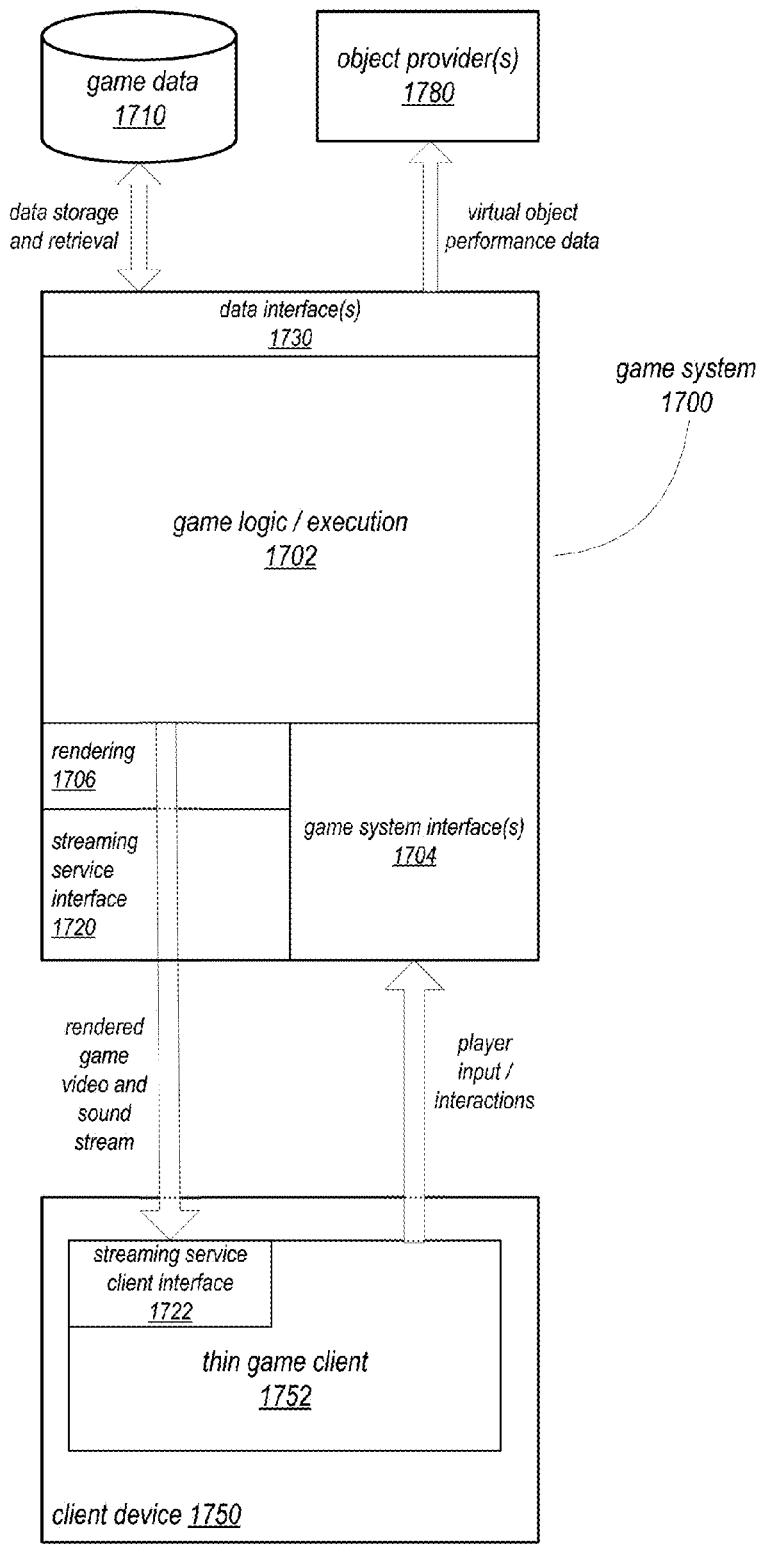
FIG. 7 illustrates an example network-based gaming environment in which a streaming service is used to provide rendered game video and sound to thin game clients, according to at least some embodiments.
Figure 8:
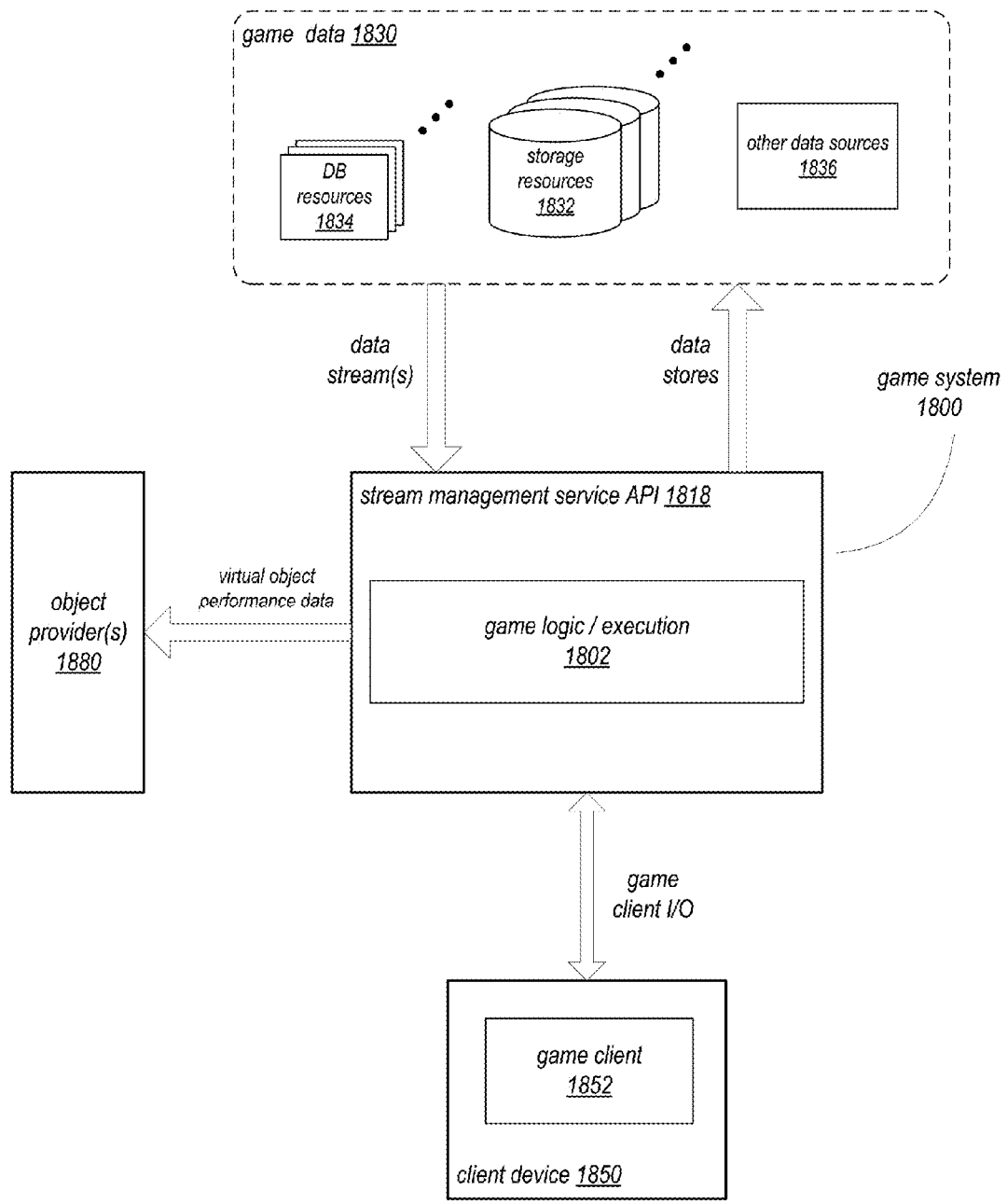
FIG. 8 is a high-level illustration of a gaming environment that leverages a stream management service, according to at least some embodiments.

Generating, updating, and rendering a complex game universe 204 that provides an accurate simulation of real-world physics and that may include tens or thousands of virtual objects 252 and that may support game play by tens or thousands of players 240 can be expensive in terms of resources and computation. Thus, at least some embodiments of game system 200 may leverage network-based computation resources, services, and protocols, including but not limited to a streaming service and protocol, to implement design 206 component, game engine 208 data collection 210 component, and other components including but not limited to rendering components and input/output interfaces to the players 240 and object providers 280. The computational power available through the network-based computation resources, as well as the data streaming capabilities provided through a streaming protocol, allows the game system 200 to provide low-latency responses to the players' interactions with the game universe as viewed on respective client devices, thus providing a responsive and interactive game experience to the players. FIG. 5 illustrates an example game system implemented on a provider network in which network-based computation resources are leveraged to provide real-time game play with low-latency rendering and streaming of game content, according to at least some embodiments. FIGS. 7 and 8 illustrate example network-based environments in which a streaming service is used to stream data to clients, according to at least some embodiments.

Figure 3:
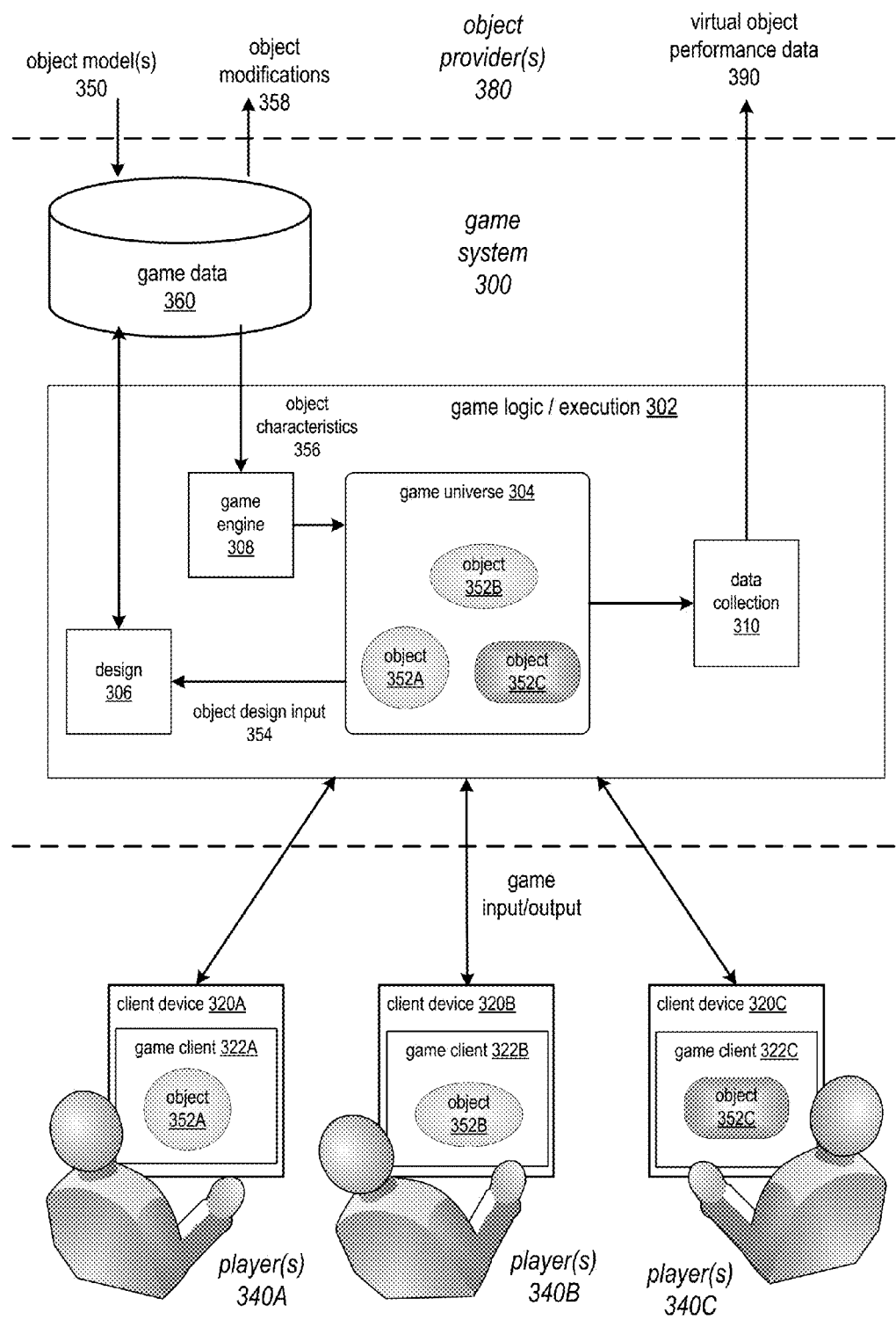
FIG. 3 illustrates an example environment in which real-world performance of one or more objects may be evaluated by one or more players during game play involving virtual representations of the objects, according to at least some embodiments.
Figure 10:
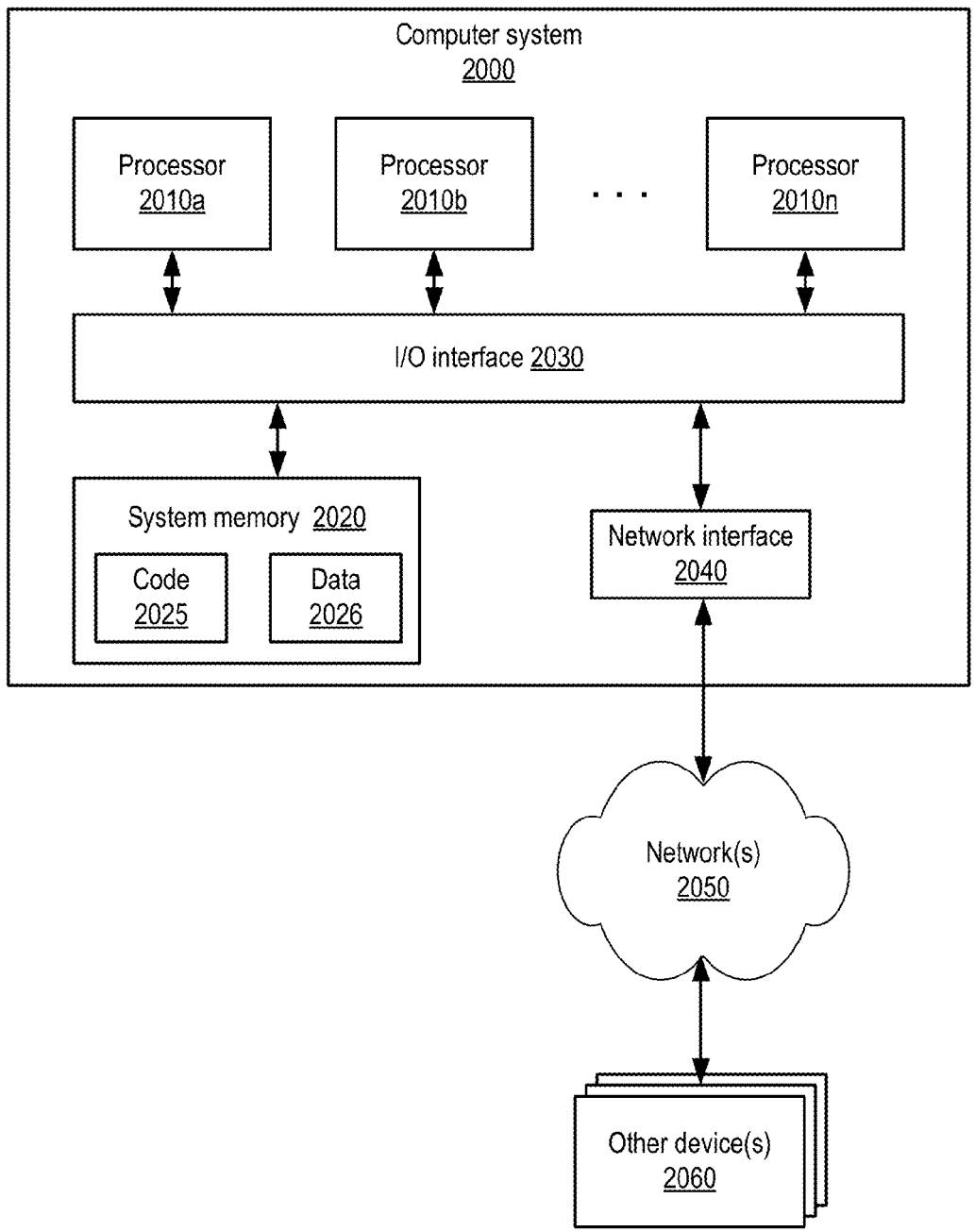
FIG. 10 is a block diagram illustrating an example computer system that may be used in some embodiments.

FIG. 3 illustrates an example environment in which real-world performance of one or more objects may be evaluated by one or more players during game play involving virtual representations of the objects, according to at least some embodiments. In at least some embodiments, the environment may include a game system 300 and one or more client devices 320. The game system 300 manages game data 360, implements game logic, and serves as an execution environment for the game. In at least some embodiments, game system 300 may include one or more computing devices, for example one or more server devices, that implement the game logic, and may also include other devices including but not limited to devices such as storage devices or servers that store or otherwise maintain or provide game data 360. Game data 360 may include one or more of, but is not limited to: persistent or global data for constructing and rendering the game universe such as graphical objects, maps, patterns, textures, and so on; data for executing game sessions within the game universe such as physics models, object models, player information, rules, and so on; and recorded data such as game session logs or records, performance data 390 for virtual objects 352 within the game universe 304. More generally, game data 360 may include any data or information that may be used by game system 300, as well as any data or information that may be generated by game system 300. An example computing device that may be used in a game system 300 is illustrated in FIG. 10. However, in some embodiments, the functionality and components of game system 300 may be implemented at least in part on one or more of the client devices 320.

A client device 320 may be any of a variety of consumer devices including but not limited to desktop computer systems, laptop/notebook computer systems, pad/tablet devices, smartphone devices, game consoles, handheld gaming devices, and wearable gaming devices. Wearable gaming devices may include, but are not limited to, gaming glasses or goggles and gaming "watches" or the like that are wearable on the wrist, arm, or elsewhere. Thus, client devices 320 may range from powerful desktop computers configured as gaming systems down to "thin" mobile devices such as smartphones, pad/tablet devices, and wearable devices. Each client device 320 may implement an operating system (OS) platform that is compatible with the device 320. A client device 320 may include, but is not limited to, input and output components and client software (game client 322) for the game system 300 via which respective players 340 can participate in game sessions currently being executed by the game system 300. The game client 322 on a particular client device 320 may be tailored to support the configuration and capabilities of the particular device 320 type and the OS platform of the device 320. An example computing device that may be used as a client device 320 is illustrated in FIG. 10.

In at least some embodiments, the game system 300 may implement an online multiplayer game, and the game system 300 may be or may include one or more devices on a network of a game provider that implement the online multiplayer game logic and that serve as or provide an execution environment for the online multiplayer game. In these online multiplayer game environments, game clients 320 are typically remotely located from the game system 300 and access the game system 300 via wired and/or wireless connections over an intermediate network or networks such as the Internet. Further, client devices 320 may typically each have both input and output capabilities for playing the online multiplayer game. FIG. 5 illustrates an example network-based multiplayer gaming environment that includes a game system hosted on a provider network that may, for example, serve as an execution environment for a multiplayer online game.

However, in some embodiments, a game system 300 may at least in part be implemented as or on one or more devices that locally implement game logic and locally provide at least some execution of a multiplayer game, for example a gaming console that serves as an execution environment for a console-based multiplayer game installed on the console (or executed from media inserted into the console). In these game environments, game clients 320 are typically local to the system 300 and access the system 300 via local wired or wireless connections. Further, in these local multiplayer game environments, the device(s) that hosts the multiplayer game (e.g., a gaming console) may generally include or couple to a display device such as a television or monitor for displaying game graphics, and client devices 320 may typically provide only control/input capabilities for playing the multiplayer game hosted by the device (e.g., the client devices 320 may be "game controllers" coupled to a console).

Note, however, that a multiplayer game system 300 such as a gaming console may connect via wired and/or wireless connections to one or more remote network sites, services, or devices, for example to one or more object provider 380 sites for downloading object models 350 and for uploading object modifications 358 and virtual object performance data 390, to a network-based storage service for storing and retrieving game data 360, to a server or servers of the game provider for updates, game downloads, and other information, or to one or more other instances of the game system 300 that host the multiplayer game if the game environment allows players 340 to participate in a game session from multiple different multiplayer game system 300 instances via a network.

Figure 9:
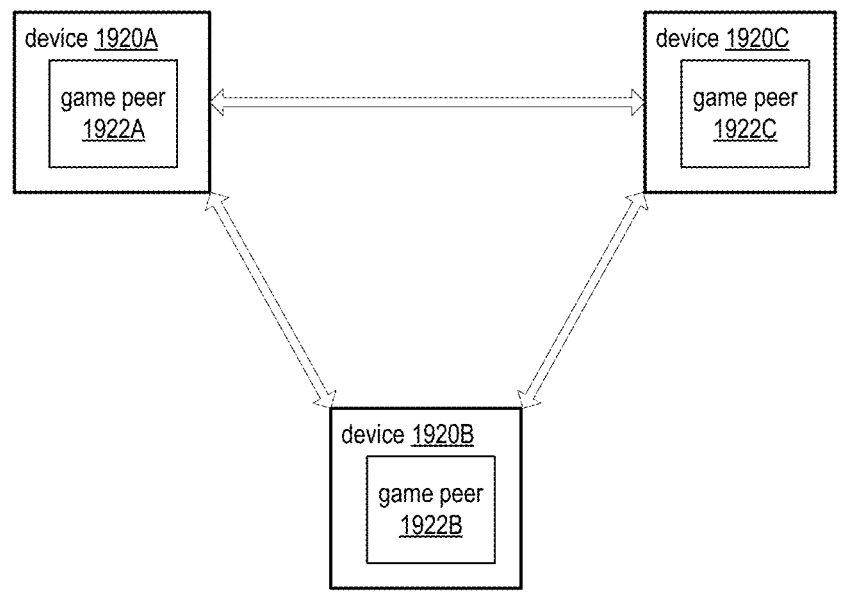
FIG. 9 illustrate an example peer-to-peer gaming environment, according to at least some embodiments.

In some embodiments, instead of a game system implemented according to a client-server model or variation thereof in which one or more devices such as servers host most or all of the functionality of the game system, a game system 300 may be implemented according to a distributed or peer-to-peer architecture, for example as shown in FIG. 9. For example, in a peer-to-peer game system architecture, at least some of the game functionality and components of a game system 300 as shown in FIG. 3 may be distributed among one, two, or more client devices 320 that collectively participate in a peer-to-peer relationship to create and/or modify virtual objects 352 within a game universe 304, execute game sessions including the virtual objects 352 within the game universe 304, and collect performance data for the virtual objects 352 within the game universe 304.

Games that may be implemented by a game system 300 as described herein may vary from tightly scripted games to games that introduce varying amounts of randomness to the game play, and may include any game type including but not limited to action games such as racing games or sports games, role-playing, world-building games, and so on. A game may, for example, be a game in which one or more players 340 attempt to achieve some goal or overcome some obstacle, and may include multiple levels that the players 340 have to overcome. A multiplayer game may, for example, be a game in which the players 340 cooperate to achieve goals or overcome obstacles, or a game in which one or more of the players 340 compete against one or more other players 340, either as teams or as individuals. Alternatively, a game may be a game in which one or more players 340 may more passively explore and make discoveries within a complex game universe 304 without any particular goals in mind, or a world-building multiplayer game in which the players 340 may actively modify their environments within the game universe 304. The games may include everything from relatively simple, two-dimensional (2D) casual games to more complex 2D or three-dimensional (3D) action or strategy games, to complex 3D massively multiplayer online games (MMOGs) such as massively multiplayer online role-playing games (MMORPGs) that may simultaneously support hundreds or thousands of players in a persistent online "world".

As illustrated in FIG. 3, one or more players 340 may interact with game system 300 via respective client devices 320 to design or modify virtual objects 352, to initiate game sessions within a game universe, and to control the players' respective virtual objects 352 within the game universe. FIG. 3 shows, as a non-limiting example, three players 340A-340C that interact with game system 300 via game clients 322A-322C on respective client devices 320A-320C. In at least some embodiments, game system 300 may store information for each player 340. Player information may include, but is not limited to, account information, profile information, game play statistics, game resource information, group or team membership information, and so on. A player's game resource information may, for example, include information on virtual object(s) 352 associated with this player 340, for example indications of which object models 350 the player 340 has been granted access to as an individual or as a member of a group or team.

For a particular game session, game logic/execution 302 of the game system 300 may generate a game universe 304 that includes the game session's context, characters, virtual objects 352, and environment. The players 340 may view a perspective of the game universe 304 and manipulate their virtual objects 352 within this universe 304 via the game clients 322 on respective client devices 320. Embodiments of a game system 300 may include or leverage a game engine 308 may simulate interactions of the virtual objects 352 within the universe according to a real-world physics model during game play within the game universe 304, at least in part in response to game input from the players 340. To simulate interactions within the game universe 308, the game engine 308 may apply a physics model that incorporates one or more of, but is not limited to: global, generally static physical factors (e.g., gravity); player 340 game input (e.g., input controlling the virtual objects 352 in a game session); characteristics 356 of the virtual objects 352 as defined by respective object models 350; and environmental factors within the game universe 304 including generally static (e.g., topography) and potentially dynamic (e.g., weather) environmental factors.

The following is a broad description of an example method for game execution within a game universe 304, and is not intended to be limiting. Typically, game logic/execution 302 of the game system 300 is implemented according to an event-driven architecture in which a game event loop monitors for and reacts to players' inputs to and interactions within the game universe 304 as controlled by game clients 322 on client devices 320, for example input controlling or manipulating virtual objects 352 within the game universe 304. Based upon the players' inputs and interactions within the universe 304 and on other game factors (e.g., scripted events and/or a randomness component) at iterations of the game event loop, the game session progresses along a game session timeline, with the game universe 304 being modified and updated by game engine 308 accordingly.

Figure 6:
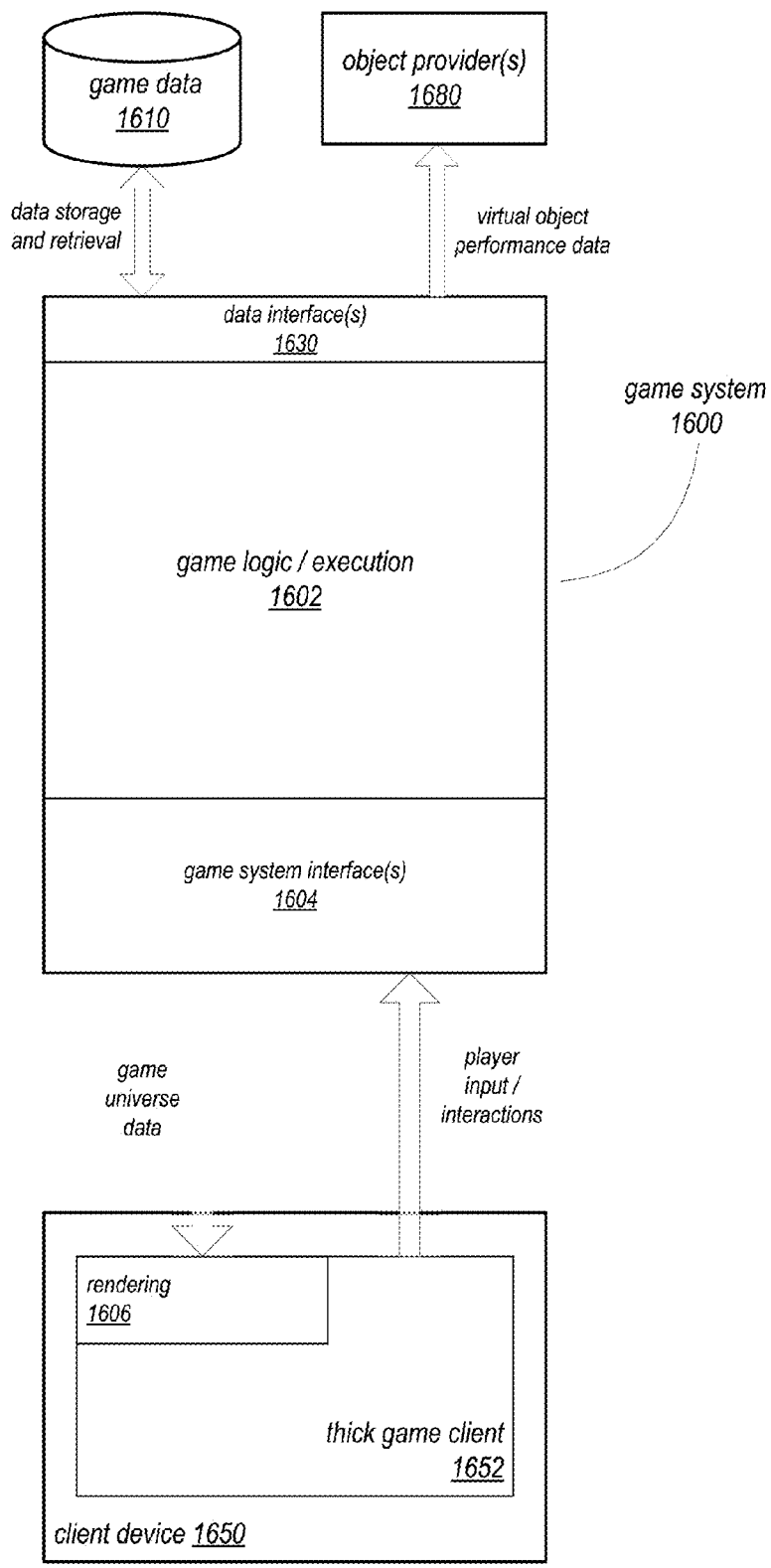
FIG. 6 illustrates an example network-based gaming environment that uses thick game clients, according to at least some embodiments.

In some embodiments, concurrent with the game event loop execution, game system 300 renders a 2D or 3D representation of the universe 304 based on the current state of the universe 304, generates video and sound according to a video frame rate based upon the rendering, and sends or streams the video and sound output to the client devices 320 for display. Note that video and sound may be generated for and sent or streamed to each client device 320 according to the respective player's current perspective or view of the universe 304. These game clients may be referred to as "thin" game clients as the game clients may not implement a 2D or 3D rendering component. FIG. 7 illustrates an example network-based gaming environment in which rendered game video and sound is streamed to thin game clients on client devices. However, in some embodiments, at least a portion of the actual rendering may be performed by "thick" game clients 322 on the client devices 320 that do implement a 2D or 3D rendering component. In these implementations, instead of the game system 300 performing the full rendering of the game universe 304 into video and sound and sending the video and sound to "thin" game clients on client devices 320 for display as shown in FIG. 7, the game system 300 may instead send universe 304 data to the client devices 320 from which thick game clients 322 can render and display video and sound. FIG. 6 illustrates an example network-based gaming environment that uses thick game clients on client devices.

Embodiments of a game system 300 may include a design 306 component that allows players 340 to create, select, and/or modify virtual objects 252 via object design input 354 to game clients 322. The design 306 component may provide one or more graphical and/or textual interfaces via which players 340 or other entities may design and modify virtual objects 352 for use within the game universe 304. In some embodiments, object model(s) 350 from which virtual objects 352 may be generated may be obtained from one or more sources external to the game system 300. For example, an object provider 380 (e.g., a product producer, vendor, research lab, distributor, etc.) may provide an object model 350 from which a virtual object 352 may be generated by the game system 300. In some embodiments, instead of or in addition to obtaining object models 350 from object provider(s) 380, a player 340 or team of players may access design 306 component to create a new object model 350 for a new virtual object 352 within the game system 300 using object design input 354 to game client(s) 322.

In at least some embodiments, once an object model 350 is obtained or created, a virtual object 352 may be instantiated within the game universe 304 according to the object model 350, and a player 340 or team of players may make one or more modifications to the virtual object 352 via an interface to the design 306 component. In some embodiments, a player's modifications to a virtual object 352 within the game universe 304 may cause a corresponding object model 350 to be modified or updated within the game system 300. In some embodiments, new object models 350 created by a player 340 or team via design 306 component, and/or modifications 358 to a virtual object 352 made by a player 340 or team via design 306 component, may be provided to one or more external entities. As an example, modifications 358 to a virtual object 352 may be provided to an object provider 380 (e.g., a product producer) that provided the respective object model 350 from which the modified virtual object 352 was generated. As another example, a design specification or object model 350 for a new physical object 382 created and tested by a player 380 or team of players as a virtual object 352 within the game universe may be provided to one or more object providers 380 for evaluation, along with performance data 358 for the virtual object 352.

Embodiments of a game system 300 may include a data collection 310 component that collects performance data 390 for the virtual objects 352 during game play. The collected performance data 390 may be provided to one or more entities for analysis, for example to one or more object providers 380 external to the game system. The performance data 390 may be provided or distributed to an object provider 380 in any of various ways and via a variety of communications channels, including but not limited to as a real-time stream of data during game play or as periodic or aperiodic uploads or downloads of collections of performance data 390 to the object provider 380. Performance data 352 collected for a virtual object 352 may be distributed to two or more different object providers 380, and performance data 352 collected for two or more different virtual objects 352 may be distributed to respective ones of two or more different object providers 380. Note that, in some embodiments, instead of or in addition to providing the performance data 390 to object providers 380, at least part of the performance data 390 may be provided to one or more of the players 340 or to teams of players 340.

The performance data 390 for the virtual objects 352 may be evaluated, for example by an object provider 380 such as a product producer, vendor, research lab, distributor, etc., and may be used, for example, in making decisions regarding real-world production or marketing of various products. In some cases, at least one instance of a physical object corresponding to a virtual object 352 may be generated, manufactured, constructed, or assembled by an object provider 380 at least in part based on the evaluation of the performance data 390 for the virtual object 352.

In some embodiments, in addition to providing performance data 390 that simulates real-world performance data for physical objects, data collection 310 component may also collect and provide information on various preferences of the players 340 within the game that may be used, alone or in combination with the performance data 390, in making production or marketing decisions. The preference information may, for example, indicate which particular virtual objects are used most, which modifications to virtual objects are popular, which combinations of virtual objects are popular, and so on.

In at least some embodiments, the game system 300 may provide one or more user interfaces (e.g., via web pages or client applications) and/or one or more application programming interfaces (APIs) via which object providers 380 may access the game system 300. For example, an API may be provided via which an object provider 380 may provide object models 350 and other object information such as performance aspects that are to be monitored for the object models 350 to the game system 300, receive object modifications 358 from the game system 300, and obtain virtual object performance data 390 from the game system 300.

Figure 4:
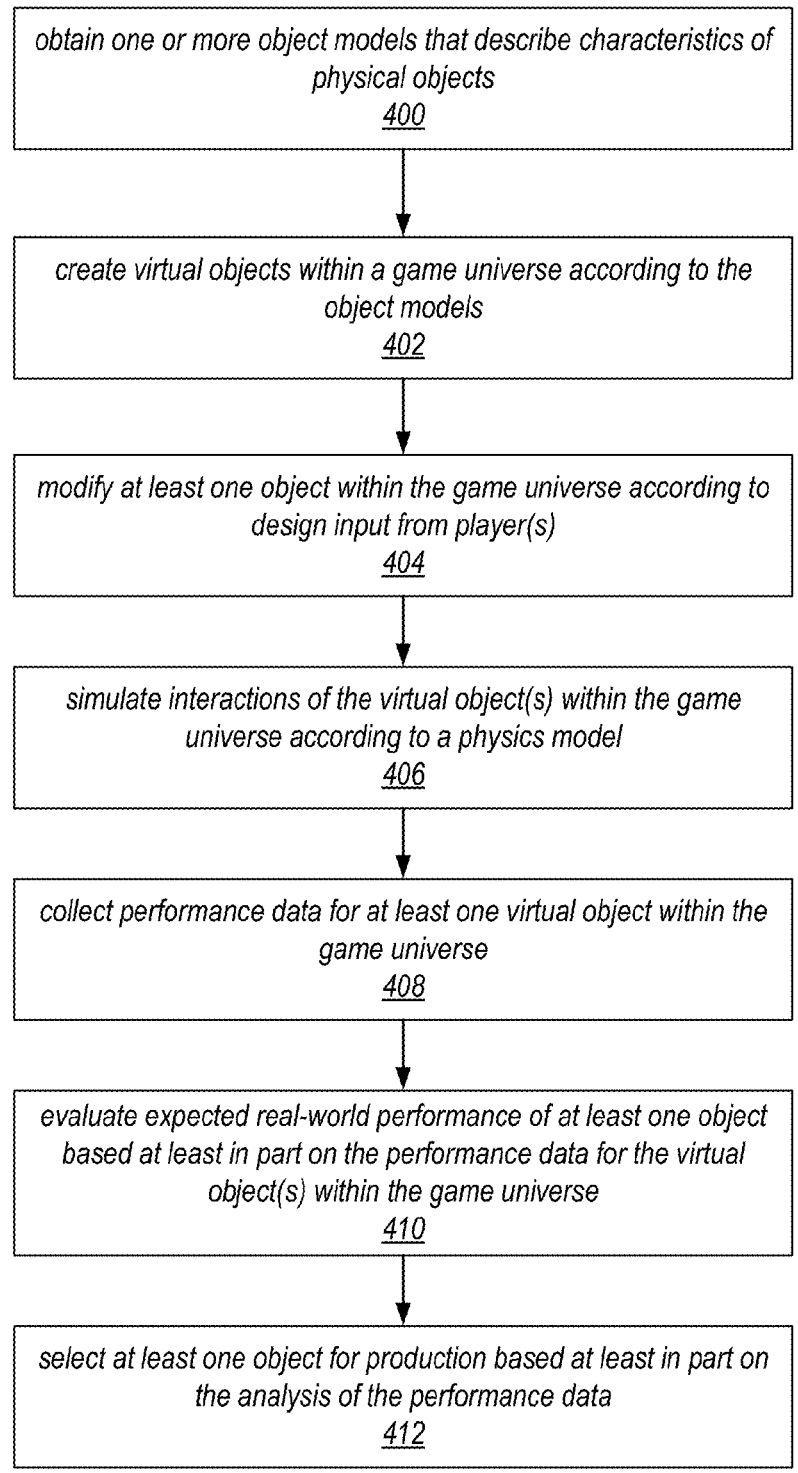
FIG. 4 is a flowchart of a method for modifying objects and evaluating performance of the modified objects using a game system, according to at least some embodiments.

FIG. 4 is a flowchart of an example method for modifying objects and evaluating performance of the modified objects using an embodiment of a game system such as game system 300 illustrated in FIG. 3. As indicated at 400, one or more object models that describe characteristics of physical objects may be obtained. For example, an object provider (e.g., a product designer, producer, vendor, research lab, distributor, etc.) may provide an object model for an object from which a virtual object may be generated within a game universe. As an example, in some embodiments, the game system may provide an interface (e.g., an API) via which object providers may provide object models to the game system. As an alternative, a player or team of players may create a new object model from scratch using a design component, or by assembling a composite object model from other object models within the game system using the design component. An object model may specify various physical characteristics and parameters of the respective object (e.g., weight, dimensions, materials, etc.) in enough detail so that the game system may realistically simulate the physics and performance of the respective object within the game universe.

As indicated at 402, one or more virtual objects may be generated within a game universe according to the object models. For example, a game engine of the game system may obtain physical characteristics of an object from an object model and generate a virtual representation of the object within the game universe according to the physical characteristics.

As indicated at 404, at least one object may be modified within the game universe according to design input from one or more players. In at least some embodiments, once an object model is obtained or created and virtual object is generated within the game universe according to the object model, a player or team of players may make one or more modifications to the virtual object via an interface to a design component. Modifications to a virtual object within the game universe may update the corresponding object model within the game system, and the modifications may also be provided to one or more external entities (e.g., object providers). As an example, in some embodiments, the game system may provide an interface (e.g., an API) via which the object providers may receive the modifications from the game system.

As indicated at 406, interactions of the virtual objects within the game universe may be simulated according to a physics model. For example, a game engine of the game system may simulate real-world physical interactions of the virtual objects within the game universe by applying a physics model that incorporates one or more of, but is not limited to: global, generally static physical factors (e.g., gravity); player game input (e.g., input controlling the virtual objects in a game session); characteristics of the virtual objects as defined by object models; and environmental factors within the game universe including generally static (e.g., topography) and potentially dynamic (e.g., weather) environmental factors.

As indicated at 408, performance data for at least one virtual object within the game universe may be collected during game play. For example, a data collection component of the game system may monitor one or more performance aspects of virtual objects within the game universe during game play, may collect data for the monitored aspects, and may store the performance data (e.g., as game data 360 as shown in FIG. 3) and/or stream or otherwise provide the performance data to one or more object providers (e.g., product designers, producers, vendors, research labs, distributors, etc.). As an example, in some embodiments, the game system may provide an interface (e.g., an API) via which object providers may obtain the performance data from the game system. Note that, in some embodiments, instead of or in addition to providing the performance data to object providers, at least part of the performance data may be provided to one or more of the players or to teams of players.

In some embodiments, an object model may include specifications of various performance aspects or metrics of the respective virtual object that are to be monitored. Alternatively, other methods of specifying the performance aspects or metrics may be used. For example, in some embodiments, the game system may provide a user interface via which players can specify the performance aspects to be monitored for a virtual object. As another example, in some embodiments, the game system may provide an interface (e.g., an API) via which external entities (e.g., object providers such as product producers, designers, etc.) may specify the performance aspects to be monitored for object models that are used within the game system.

As indicated at 410, expected real-world performance of at least one object may be evaluated based at least in part on the performance data for the virtual object(s) within the game universe. The performance data for the virtual objects as created or modified within the game universe may simulate real-world performance data for similar, real-world physical objects. Thus, the performance data for a virtual object may be used in predicting real-world performance of a corresponding physical object. The performance data for virtual objects may be evaluated, for example by an object provider such as a product producer, vendor, research lab, distributor, etc., and may be used, for example, in making decisions regarding real-world production or marketing of various products based on the virtual objects.

As indicated at 412, at least one object may be selected for production based at least in part on the analysis of the performance data. In some cases, at least one instance of a physical object corresponding to a virtual object may be generated, manufactured, constructed, or assembled by an object provider at least in part based on the evaluation of the performance data for the virtual object.

EXAMPLE USE CASES

Embodiments of the game system as described herein may allow object providers (e.g., product designers, producers, vendors, research labs, distributors, etc.) to test and evaluate new designs for or modifications to real-world physical objects in virtual environments. Using embodiments, object providers may obtain performance data for object designs or modifications from hundreds, thousands, or even tens of thousands of game players who use virtual representations of the objects in game universes that realistically simulate real-world physical interactions of the objects. As just one example, a virtual object may be a virtual representation of an automobile or other vehicle for use during game play of a racing game. A vehicle manufacturer may provide an object model for the vehicle that may be used to create the virtual vehicle within the racing game universe. The object model may also specify physical characteristics of the vehicle (e.g., weight, weight distribution, power, dimensions, wheelbase, ground clearance, tire type, etc.). The players, or teams of players, may use that virtual vehicle in many races. A game engine for the racing game may realistically simulate the physics and performance of the vehicle during races within the game universe. Performance data for the virtual vehicle during the races may be collected and provided to the vehicle manufacturer. Using the racing game, the vehicle manufacturer may receive performance data for the virtual vehicle from thousands or tens of thousands of races, and from tens, hundreds or thousands of different players or teams.

In addition, in at least some embodiment, a player or team of players may be allowed to modify a virtual representation of a physical object within the game universe. Using the racing game as an example, a player or team may be allowed to "tune" an engine by replacing or reprogramming electronics (e.g., an engine management system (EMS)), adjust the suspension, change tires, change fuel type, reconfigure body panels to modify aerodynamics, add or remove accessories, and so on. The modified vehicle may be used by the player or team in races, and may be further modified between races. Multiple players or teams may make various modifications to their own game versions of the virtual vehicle and compete against each other in the races. Two or more different base vehicles may be modified and used in the races by different players or teams. A game engine for the racing game may realistically simulate the physics and performance of the vehicles as modified during the races within the game universe. Performance data for the modified virtual vehicles during the races may be collected and provided to the vehicle manufacturer(s).

In some embodiments, two or more virtual objects may be used in combination, and performance data for the combined virtual objects may be analyzed in combination or separately. Using the racing game as an example, a vehicle and the tires on the vehicle may be two different virtual objects based on different object models, and the object models for the tires may be provided by a different object provider than the base object model for the vehicle. A virtual object in a combination may be replaced with a different virtual object. For example, the tires from one tire producer on a vehicle may be replaced with different tires from the same tire producer or tires from a different tire producer. A game engine for the may realistically simulate the physics and performance of the different combinations of virtual objects (e.g., vehicles and tires) within the game universe, and performance data for the combinations may be collected and provided to object providers, for example tire and vehicle producers.

In at least some embodiments, an object provider may provide an object model for an object from which a virtual object may be generated within the game universe. The object model may specify various physical characteristics and parameters of the object (e.g., weight, dimensions, materials, etc.) in enough detail so that the object model may be used by the game engine to realistically simulate the physics and performance of the object within the game universe. A player or team of players may modify the virtual representation of the physical object within the game universe, either during or between game sessions. Modifying the virtual representation may result in modifications being made to the object model (or to a copy of the object model specific to the player or team). For example, adding an accessory to a virtual object may result in incorporating physical characteristics of the accessory into the object model for the virtual object, or in modifying characteristics of the virtual object as recorded in the object model. Performance data for the virtual object(s) may be collected and provided to an object provider. Thus, using the game system, an object provider may receive performance data for many variations of a virtual object based on an object model provided by the object provider from thousands or tens of thousands of game sessions, and from tens, hundreds or thousands of different players or teams of players.

In some embodiments, instead of or in addition to obtaining object models from object providers for possible modification and performance evaluation in a game system, players or teams of players may be allowed to create new object models within the game universe, and to create and use virtual objects within the game universe based on the new object models. A new object model and virtual object may be created from "scratch", or may be constructed or assembled as a combination of existing virtual objects and their corresponding object models. Note that creating a virtual object from scratch may in some cases involve determining complex physical properties of the virtual object. Existing virtual objects that are assembled to create a new virtual object (and new object model) may be referred to as parts of the new virtual object. The object model for a new virtual object (whether created from scratch or by assembling parts) may specify various physical characteristics and parameters of the respective object in enough detail so that an object model for the new object may be created and used by the game engine to realistically simulate the physics and performance of the new object within the game universe.

A non-limiting example use case for embodiments of a game system in which players may create new virtual objects would be a competition that pits two or more teams in designing virtual representations of physical objects for testing within a game universe. As an example, the teams may be tasked with designing a solar-powered car. Virtual representations of the designs may be generated as virtual objects (virtual solar-powered cars, in this example), and the virtual objects may be subjected to one or more events within the game universe (e.g., races across a virtual land course as rendered in the game universe) to determine their relative performance under different environmental conditions within the game universe. Results of the competition may be provided to one or more entities, for example research firms, universities, government agencies, product producers such as manufacturers, and so on, for evaluation, and production decisions may be made at least in part based on the performance data obtained from the game system.

In some embodiments, in addition to providing performance data that simulates real-world performance data for physical objects, a game system may also collect and provide information on various preferences of the players within the game community that may be used, alone or in combination with the performance data, in making production or marketing decisions for physical objects. The preference information may, for example, indicate which particular virtual objects are used most, which modifications to virtual objects are popular, which combinations of virtual objects are popular, and so on. The preference information may include information on characteristics, modifications, or accessories that affect the performance of objects. For example, in the racing game example, the preference information may indicate that the players prefer a particular type of tire with a particular type of vehicle. However, the preference information may also include information on characteristics or modifications that do not directly affect performance, such as color.

While objects such as vehicles and tires are generally used as examples, physical objects for which virtual objects may be generated within a game universe as described herein may be any physical object that can be generated as a virtual object from an object model within the game universe and to which a real-world physics model can be applied by the game engine. As non-limiting examples, in addition to land, sea, and air vehicles (cars, trucks, motorcycles, ATVs, aircraft, boats, ships, spacecraft, etc.) and vehicle accessories, the objects may include construction equipment, construction materials and supplies, industrial equipment, consumer electronic devices, entertainment devices, toys, sports equipment, recreational equipment, appliances, tools, apparel, furniture, various structures (houses, buildings, towers, bridges, etc.), safety equipment, or in general any real-world, physical object that can be simulated and manipulated as a virtual object within a game universe as described herein. Note that a virtual object does not necessarily represent an object that is actually instantiated as a real-world object, but may instead represent an object design or modification to an object design that may potentially be instantiated as a real-world object.

Object-Dependent Data and Interfaces

As previously mentioned, physical objects for which virtual objects may be generated within a game universe as described herein may be any physical object that can be generated as a virtual object from an object model within the game universe and to which a real-world physics model can be applied by the game engine. Thus, the data that is included within an object model for a particular object depends on the particular object which is being modeled. The object model for a car, for example, will be different than the object model for a bicycle, and both of those object models will be different than the object model for a building. However, two object models for similar types of items may generally include substantially similar characteristics. For example, object models for two different automobile tires may typically list the same general physical characteristics that are common to automobile tires.

Similarly, the performance aspects or metrics that are monitored for a given virtual object may depend on the particular object, or on the type of object, being monitored. For example, the performance metrics that are monitored for a car will be different than the performance metrics that are monitored for a building. However, the performance metrics that are monitored for similar objects (such as two types of cars) may generally be similar, or may even be the same.

A game system may provide one or more graphical and/or textual design interfaces to a design component via which players or other entities may design and modify virtual objects for use within the game universe. For example, in a game system 300 as illustrated in FIG. 3, game system 300 may provide graphical and/or textual design interfaces to design 306 component via game clients 322. Via the design interfaces, players 340 may select, access, design, and/or modify one or more aspects or characteristics of virtual objects 352 within the game system 300 using design input 354. Design input 354 may include one or more of, but is not limited to, input to a graphical user interface (GUI) or graphical interface element to graphically manipulate or modify a displayed virtual object, or alphanumeric input to a textual interface or textual interface element to modify one or more characteristics of a virtual object.

As previously noted, many different types of virtual objects may be designed and modified within a game universe. Physical objects for which virtual objects may be generated within a game universe as described herein may be any physical object that can be generated as a virtual object from an object model within the game universe and to which a real-world physics model can be applied by the game engine. Thus, in at least some respects, the particular design interface for a particular virtual object may depend on the particular object, or on the type of object, being designed or modified. For example, a design interface for a car will be different than the design interface for a building. However, the design interface for similar objects (such as two types of cars) may generally be similar, or may even be the same.

In some embodiments, designing and modifying virtual objects may be performed via a design interface "offline"; that is, outside the game universe and outside game play. For example, a game system may provide a design interface for a virtual object such as a car via which players can design and modify virtual cars for later use in actual game play. In some embodiments, instead of or in addition to performing design and modification of virtual objects offline, designing and modifying virtual objects may be performed within the game universe, and in some cases during game play. The in-game-universe design interfaces may vary from relatively simple textual interfaces such as pop-up menus or text boxes via which players can make modifications to virtual objects to complex, object-specific graphical design interfaces that are rendered in the game universe and that fit into the game play, to combinations of one or more different types of interfaces. As a non-limiting example of a complex, in-game design interface, in a racing game, a garage may be rendered in which players, manipulating respective game characters via their game clients and using tools, equipment, and parts as rendered in the garage, can modify a virtual car that is currently in the garage, for example by replacing or reprogramming electronics (e.g., an engine management system (EMS)), adjusting the suspension, changing tires, reconfiguring body panels to modify aerodynamics, adding or removing accessories, changing oil or other fluids, or in general performing any of various modifications to a car that are enabled within the game universe. As another example of an in-game interface, a virtual "pit" may be rendered on a race track within the game universe; during a race, a player may pull their virtual race car into the pit, and a pit crew may make modifications on the car, for example changing tires, adjusting suspension, adding fuel, and so on.

Environmental Effects on Virtual Objects

In at least some embodiments, instead of or in addition to being used to test new designs for or modifications to physical objects by monitoring and collecting performance data for virtual renderings of the objects during game play within a game universe, a game system as described herein may be used to monitor and collect data regarding the effects of real-world external or environmental factors on object designs, for example structural designs, under various conditions. As a non-limiting example, a game system as described herein, for example a world-building multiplayer game system, may allow players or teams of players to design and construct various structures (houses, office buildings, bridges, etc.) out of various construction materials and using various construction techniques within a game universe, and/or may allow object providers to provide object models for rendering such structures within the game universe. The game system may allow the structures to be constructed at "virtual world" renderings of real-world locations within the game universe, for example in virtual cities such as Tokyo, San Francisco, or Miami, that may simulate geographical, geological, and other characteristics of the locations. Various environmental events, for example weather events such as typhoons or hurricanes and geological events such as earthquakes, may be randomly or intentionally introduced during the game play. The game engine may simulate various conditions of the environmental events (e.g., wind speed and direction during a hurricane, or ground motion and duration during an earthquake) that are applied to the virtual structures within the game universe according to a physics model that incorporates physical characteristics and conditions of the locations, the structures, and the environmental events. Various aspects of the structures that may indicate effects of the environmental events on the structures may be monitored and collected within the game universe. The collected data may be provided to one or more object providers and/or to one or more players as performance data for the respective structures in their particular locations and under the environmental conditions of the respective events.

Example Game Environments

Embodiments of game systems that implement the methods and apparatus as described herein in reference to FIGS. 1 through 4, for example game system 300 as illustrated in FIG. 3, may be implemented in the context of a service provider that provides virtualized resources (e.g., virtualized computing resources, virtualized storage resources, virtualized database (DB) resources, etc.) on a provider network to clients of the service provider, as illustrated in FIG. 5. Virtualized resource instances may be provisioned via one or more provider network services 1510, and may be rented or leased to the clients of the service provider, for example to a game provider 1590 client. At least some of the resource instances on the provider network 1500 (e.g., computing resources 1524) may be implemented according to hardware virtualization technology that enables multiple operating systems to run concurrently on a host computer, i.e. as virtual machines (VMs) on the host.

The provider network 1500, via the services 1510, may enable the provisioning of logically isolated sections of the provider network 1500 to particular clients as client private networks on the provider network 1500. At least some of a client's resources instances on the provider network 1500 may be provisioned in the client's private network. For example, in FIG. 5, game system 1520 may be implemented as or in a private network of game provider 1590 that is provisioned on provider network 1500 via one or more of the services 1510.

The provider network 1500, via the services 1510, may provide flexible provisioning of resource instances to clients in which virtualized resource instances can be automatically added to or removed from a client's configuration on the provider network 1500 in response to changes in demand or usage, thus enabling a client's implementation on the provider network 1500 to automatically scale to handle computation and/or storage needs. For example, one or more additional computing resources 1524 may be automatically added to game system 1520 in response to an increase in game client 1540 participation in the game implemented by game system 1520; if and when participation drops below a threshold, the computing resources 1524 can be removed. As another example, one or more additional computing resources 1524 may be automatically added to game system 1520 in response to an increase in the complexity or number of game universes being generated and rendered by the game system 1520; if and when usage drops below a threshold, the computing resources 1524 can be removed.

In at least some embodiments, game provider 1590 may access one or more of services 1510 of the provider network 1500 via application programming interfaces (APIs) to the services 1510 to configure a game system 1520 on the provider network 1500, the game system 1520 including multiple virtualized resource instances (e.g., computing resources 1524, storage resources 1532, DB resources 1534, etc.).

Virtualization services 1512 may include one or more of, but are not limited to, one or more hardware virtualization services for provisioning computing resource 1524, one or more storage virtualization services for provisioning storage resources 1532, and one or more database (DB) services for provisioning DB resources 1534. In some implementations, game provider 1590 may access one or more of these virtualization services 1512 via respective APIs to provision and manage respective resource instances in game system 1520. However, in some implementations, game provider 1590 may instead access another service (e.g., a game system service 1514 or streaming service 1516) via an API to the service; the other service may then interact with one or more of the virtualization services 1512 on behalf of the game provider 1590 to provision resource instances in the game system 1520.

The service provider may provide game system service(s) 1514 to clients of provider network 1500. Game system service(s) 1514 may include one or more services that game provider 1590 may leverage to implement a network-based game as a game system 1520 on provider network 1500. As noted above, game system service(s) 1514 may leverage virtualization services 1512 to provision various resources in game system 1520.

In some embodiments, game system service(s) 1514 may include a game backend service for creating, deploying, and managing backend or server-side game components on provider network 1500. In at least some embodiments, the game backend service may manage, for the client, the deployment, scaling, load balancing, monitoring, version management, and fault detection and recovery of the server-side game logic. In at least some embodiments, the game backend service may provide fully managed backend containers for server-side game components.

In some embodiments, game system service(s) 1514 may include a game engine service for creating, deploying, and running network-based games, including but not limited to game logic/execution 1522 components and game client 1540 components. The game engine service may include, but is not limited to, 2D and/or 3D game engines and an integrated development environment (IDE) for developing code for the 2D and/or 3D game engines. The game engine service may also include or may leverage the game backend service for provisioning and managing the backend, server-side components. Game provider 1590 may leverage one or more of game system services 1514 to implement an online game and to provision the game system 1520 on provider network 1500 for hosting the game. In at least some embodiments, the game engine service may also be leveraged by the game provider 1590 to develop and build game clients 1540 for various operating system (OS) platforms on various types of client devices (e.g., tablets, smartphones, desktop/notebook computers, etc.).

The service provider may also provide a streaming service 1516 to clients of provider network 1500. Many consumer devices, such as personal computers, tables, and mobile phones, have hardware and/or software limitations that limit the devices' capabilities as game clients to process and render data in real time. In at least some embodiments, a streaming service 1516 may allow output of a resource-intensive game implemented by game system 1520 on provider network 1500 to be rendered on the provider network 1500 and streamed from the provider network 1500 to "thin" game clients implemented on consumer devices such as personal computers, tablets, and mobile phones. In at least some embodiments, each thin game client may implement a streaming service client interface 1722 as shown in FIG. 7 for receiving and processing data received according to the streaming service 1516 on the client device 1750. Using the streaming service 1516, the game system 1520 can be scaled to handle computational and storage needs, regardless of the types of devices that the game clients 1540 are implemented on. FIG. 7 illustrates an example network-based gaming environment in which a streaming service 1516 is used to provide rendered game video and sound to thin game clients, according to at least some embodiments.

As shown in FIG. 5, in some embodiments, the service provider may also provide a stream management service 1518 to clients of provider network 1500. Game developers may leverage the stream management service 1518 in implementing a game system 1520. FIG. 8 is a high-level illustration of a gaming environment that leverages a stream management service 1518, according to at least some embodiments. Referring to FIG. 8, the stream management service 1518 may provide tools and interfaces including an application programming interface (API) 1818 via which a game developer may implement a game system 1800 that leverages one or more features of the stream management service 1518 via the API 1818. In at least some embodiments, the stream management service 1518 is a fully managed service for real-time processing of streaming data at large scales. The game developer can leverage the stream management service 1518 via API 1818 to collect and process high volumes of data per hour from multiple data sources in real-time, thus allowing the game developer to easily build and implement a game system 1800 according to the stream management service API 1818 that processes information in real-time from multiple data sources when executing a game session according to a game logic/execution 1802 engine. The data sources may include sources on the provider network and/or sources external to the provider network. Provider network sources may, for example, include DB resources 1834, storage resources 1832, and/or other data sources 1836 such as computation resources. The stream management service API 1818 may also enable sending data (e.g., data streams) to one or more destinations, such as DB resources 1834 and/or storage resources 1832 on the provider network, as well as to game client(s) 1852 on client device(s) 1850 and object providers 1880 on the provider network or on external networks.

Referring again to FIG. 5, game provider 1590 may develop and deploy an online game as game system 1520, leveraging one or more of services 1510 to configure and provision game system 1520. One or more computing resources 1524 may be provisioned and configured to implement game logic/execution 1522. In some embodiments, as shown in FIG. 5, two or more computing resources 1524 may be configured to implement game logic/execution 1522. However, in some embodiments, an instance of game logic/ execution 1522 (e.g., a 2D or 3D game engine) may be implemented as or on each of one or more computing resource 1524 instances. For example, in some implementations, each computing resource 1524 instance may be a virtual machine instance that is spun up from a machine image of the game provider's game engine stored on storage resource(s) 1532.

Storage resources 1532 and/or DB resources 1534 may be configured and provisioned for storing, accessing, and managing game data. Game system interface(s) 1526 may be configured to provide gaming I/O interfaces and protocols to the game clients 1540, as well as interfaces and protocols to one or more object providers 1580 for uploading object models to the game system 1522 and for receiving modifications and performance data for virtual objects from the game system 1522. In at least some embodiments, the game system interface(s) 1526 may include or may leverage a streaming service 1516 interface as described above. Game clients 1540 may be developed and built for various operating system (OS) platforms on various types of client devices (e.g., tablets, smartphones, desktop/notebook computers, etc.). Game clients 1540 may include thick game clients as illustrated in FIG. 7 and/or thin game clients as illustrated in FIG. 6.

Once game system 1520 is established, players can obtain game clients 1540 from game provider 1590 via one or more channels (e.g., downloading a game client from a game provider 1590 website or from a third party website such as an online site for acquiring and downloading various applications, including but not limited to games, for various types of consumer devices including but not limited to mobile devices. Players or teams of players may then design and/or modify virtual objects and participate in game sessions with the virtual objects as illustrated in FIGS. 1 through 4 by interacting with game system 1520 via game system interface(s) 1526. Game logic/execution 1522 builds, maintains, and updates the game universe for a game session including virtual objects generated according to object models created by players or provided by object providers 1580, the players act in the game universe to create or modify virtual objects and to control respective characters or virtual objects during game play using game clients 1540 on their client devices, and the game system 1520 collects performance data for virtual objects within the game universe and provides the performance data to the object providers 1580.

FIG. 6 illustrates an example network-based gaming environment that uses thick clients, according to at least some embodiments. Game system 1600 may include game logic/execution 1602 component, front-end game system interface(s) 1604 for receiving game input from and sending game output to game clients 1652, and backend data interface(s) 1630 for storing and retrieving game data 1610 and for providing virtual object performance data (or other data) to object providers 1680. Game logic/execution 1602 component may generate a game universe that includes the game session's context, characters, virtual objects, and environment. Based upon players' inputs and interactions with the game universe and on other game factors (e.g., scripted events and/or a randomness component), a game session progresses along a timeline, with the game universe being modified and updated by game logic/execution 1602 component accordingly.

A client device 1650 may implement a thick game client 1652. Thick game client 1652 may implement a 2D or 3D rendering 1606 component. Rather than game logic/execution 1602 performing full rendering of the 2D or 3D game universe as the universe progresses along the timeline, game universe data may be periodically, aperiodically, or continuously sent to the thick game client 1652 via game system interface(s) 1604. On the client device 1650, the rendering 1606 component may render, display, and update a 2D or 3D representation or view of the game universe according to the received game universe data.

FIG. 7 illustrates an example network-based gaming environment in which a streaming service is used to provide rendered game video and sound to thin game clients, according to at least some embodiments. Game system 1700 may include game logic/execution 1702 component, front-end game system interface(s) 1704 for receiving game input from game clients 1752, and backend data interface(s) 1730 for storing and retrieving game data 1710 and for providing virtual object performance data (or other data) to object providers 1780. Game system 1700 may further include a 2D or 3D rendering 1706 component and a streaming service interface 1720. The streaming service interface 1720 may, for example, be implemented according to a streaming service 1516 as illustrated in FIG. 5. Returning to FIG. 7, game logic/execution 1702 component may generate a game universe that includes the game session's context, characters, virtual objects, and environment. Based upon players' inputs and interactions with the game universe and on other game factors (e.g., scripted events and/or a randomness component), a game session progresses along a timeline, with the game universe being modified and updated by game logic/execution 1702 component accordingly.

Instead of implementing a thick game client as illustrated in FIG. 6, client device 1750 may implement a thin game client 1752. Thin game client 1752 may implement a streaming service client interface 1722. Rather than performing rendering of the 2D or 3D game universe on the client device 1750, rendering 1706 component of game system 1700 may render a 2D or 3D representation or view of the game universe as the universe progresses along the timeline. Streaming service interface 1720 may generate video from the rendering of the game universe and stream the video and accompanying sound to the thin game client 1752 according to a streaming service protocol. At the client device 1750, the streaming service client interface 1722 receives the stream from streaming service interface 1720, and the thin game client 1750 displays the video to the client device 1750.

Embodiments of a game system as described herein may be implemented according to a client-server model in which one or more devices (e.g., server devices) host most or all of the functionality of the game system and one or more client devices hosting game clients (the "clients") access the game system (the "server"), for example via an intermediate network such as the Internet, to play game sessions. However, embodiments of the game system may be implemented according to other models, for example according to a peer-to-peer model.

FIG. 9 illustrates an example peer-to-peer gaming environment, according to at least some embodiments. In the peer-to-peer model, at least some of the game functionality and components of a game system 300 as shown in FIG. 3 may be distributed among two or more game peers 1922 implemented on the players' devices 1920. A device 1920 may be any of a variety of consumer devices including but not limited to desktop computer systems, laptop/notebook computer systems, pad/tablet devices, smartphone devices, game consoles, handheld gaming devices, and wearable gaming devices. Wearable gaming devices may include, but are not limited to, gaming glasses or goggles and gaming "watches" that are wearable on the wrist or arm. The game peers 1922 may participate in peer-to-peer relationships to execute game sessions, and each game peer 1922 may implement at least part of the game system functionality and components of a game system 300 as illustrated in FIG. 3. In addition, one or more of the peered devices 1920 may store game data.

In some embodiments, different game peers 1922 may implement different parts of the game functionality and components of the game system as illustrated in FIGS. 1 through 4. For example, in some embodiments, one of the game peers 1922 may implement a design component, while another game peer 1922 may implement a data collection component. In some embodiments, one or more of the devices 1920 that are participating in the peer-to-peer model may serve as a store and/or source for game data 1960. Alternatively, in some embodiments, at least a portion of game data 1960 may be stored to and sourced from one or more remote game data stores, for example using a storage virtualization service of a service provider network as illustrated in FIG. 5.

Illustrative System

In at least some embodiments, a computing device that implements a portion or all of the for designing, modifying, and evaluating real-world objects using computer-based games as described herein may include a general-purpose computer system that includes or is configured to access one or more computer-accessible media, such as computer system 2000 illustrated in FIG. 10. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for designing, modifying, and evaluating real-world objects using computer-based games, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 9, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 9 for implementing embodiments of methods and apparatus for designing, modifying, and evaluating real-world objects using computer-based games. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    performing, by one or more computing devices:
        receiving, from a user device, user input to modify a game object;
        modifying the game object in response to the user input according to an object model that specifies characteristics of a physical object;
        generating performance data corresponding to the modified game object responsive to game play using the modified game object; and
        providing the performance data to at least the user device.

2. The method of claim 1, further comprising modifying the game object based at least in part on a physics model of a game environment.

3. The method of claim 1, wherein the performance data for the modified game object simulates real-world performance data for similar modifications to the physical object.

4. The method of claim 1, further comprising providing the performance data to an object provider.

5. The method of claim 4, further comprising providing the modified game object to the object provider.

6. The method of claim 1, further comprising generating preference information based on the user input, wherein the preference information indicates one or more modifications of the game object.

7. The method of claim 6, wherein the preference information further indicates popularity of the one or more modifications, popularity of combinations of the game object with one or more other objects, or both.

8. The method of claim 1, further comprising:
    generating additional performance data for one or more other modified game objects; and
    providing the additional performance data to the user device.

9. The method of claim 8, further comprising providing the additional performance data to an object provider.

10. A system, comprising: one or more processors; and
    a memory storing instructions that, when executed by the one or more processors, cause the one or more processors to perform operations including:
        receiving, from a user device, user input to modify a game object;
        modifying the game object in response to the user input according to an object model that specifies characteristics of a physical object;
        generating performance data corresponding to the modified game object responsive to game play using the modified game object; and
        providing the performance data to at least the user device.

11. The system of claim 10, wherein the operations further include generating game data based at least in part on the user input and the game play.

12. The system of claim 10, wherein the operations further include receiving, from the user device, one or more performance metrics, wherein generating the performance data includes monitoring the one or more performance metrics in the game play.

13. The system of claim 10, wherein the operations further include:
    receiving, from a second user device, additional user input to modify the game object;
    generating additional performance data for use of the modified game object responsive to additional game play using the modified game object; and
    providing the additional performance data to the user device.

14. A non-transitory computer-readable storage medium storing instructions that, when executed by one or more processors, cause the one or more processors to perform operations including:
    receiving, from a user device, user input to modify a game object;
    modifying the game object in response to the user input according to an object model that specifies characteristics of a physical object;
    generating performance data corresponding to the modified game object responsive to game play using the modified game object; and
    providing the performance data to at least the user device.

15. The non-transitory computer-readable storage medium of claim 14, wherein the performance data for the modified game object simulates real-world performance data for similar modifications to the physical object.

16. The non-transitory computer-readable storage medium of claim 14, wherein the operations further include modifying the game object based at least in part on a physics model of a game environment.

17. The non-transitory computer-readable storage medium of claim 16, wherein the physics model includes environmental factors, wherein the environmental factors include static environmental factors, dynamic environmental factors, or both.

18. The non-transitory computer-readable storage medium of claim 14, wherein the operations further include:
    receiving, from a second user device, additional user input to modify the game object; and
    modifying the game object based at least in part on the additional user input.

19. The non-transitory computer-readable storage medium of claim 18, wherein the operations further include providing the performance data to the second user device.

20. The non-transitory computer-readable storage medium of claim 14, wherein the operations further include providing the performance data to an object provider.

* * * * *